(12) United States Patent
Okamoto et al.

(10) Patent No.: US 7,554,298 B2
(45) Date of Patent: Jun. 30, 2009

(54) CHARGER AND INTEGRATED CIRCUIT HAVING FIRST AND SECOND CHARGING CURRENTS

(75) Inventors: Manabu Okamoto, Kanagawa (JP); Kiyoshi Mori, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 294 days.

(21) Appl. No.: 11/221,894

(22) Filed: Sep. 9, 2005

(65) Prior Publication Data
US 2006/0076928 A1 Apr. 13, 2006

(30) Foreign Application Priority Data
Sep. 28, 2004 (JP) ............... 2004-280845

(51) Int. Cl.
*H02J 7/00* (2006.01)
(52) U.S. Cl. .............. 320/138; 307/46; 320/163
(58) Field of Classification Search .......... 320/137, 320/138, 158, 159, 163, 164, 170, FOR. 126, 320/101, 132; 307/46
See application file for complete search history.

(56) References Cited

U.S. PATENT DOCUMENTS

| | | | | |
|---|---|---|---|---|
| 4,792,743 A * | 12/1988 | Tsujino et al. | ............... | 320/124 |
| 5,422,559 A | 6/1995 | Hall et al. | | |
| 5,663,629 A * | 9/1997 | Hinohara | ............... | 320/158 |
| 5,723,970 A * | 3/1998 | Bell | ............... | 320/140 |
| 5,831,416 A * | 11/1998 | Fisher | ............... | 320/132 |
| 6,288,522 B1 * | 9/2001 | Odaohhara et al. | ............ | 320/138 |
| 6,956,357 B2 * | 10/2005 | Nagai et al. | ............... | 320/148 |
| 7,012,405 B2 * | 3/2006 | Nishida et al. | ............... | 320/137 |
| 2001/0004198 A1 * | 6/2001 | Matsuyama | ............... | 320/101 |
| 2006/0103355 A1 * | 5/2006 | Patino et al. | ............... | 320/138 |

FOREIGN PATENT DOCUMENTS

JP 09-84276 3/1997
JP 2003-092843 3/2003

OTHER PUBLICATIONS

Chinese Office Action dated Apr. 6, 2007 (with English translation).
Japanese Office Action dated Jun. 17, 2008 (with partial English translation).

* cited by examiner

*Primary Examiner*—Akm E Ullah
*Assistant Examiner*—Arun Williams
(74) *Attorney, Agent, or Firm*—McGinn IP Law Group, PLLC

(57) ABSTRACT

A charger of the present invention includes a charging transistor and a charging integrated circuit. The charging transistor is series-connected with a secondary battery to supply a charging current to the secondary battery. The charging integrated circuit is incorporated into a package having a higher heat releasability than that of the charging transistor. The charging integrated circuit controls the charging transistor and besides, supplies a charging current to the secondary battery. For this purpose, the charging integrated circuit includes a current source supplying this charging current. The charging current from the current source is supplied to the secondary battery together with the charging current from the charging transistor to charge the secondary battery.

17 Claims, 2 Drawing Sheets

CHARGER AND INTEGRATED CIRCUIT HAVING FIRST AND SECOND CHARGING CURRENTS

BACKGROUND OF THE INVENTION

1. Field of the Invention

The present invention relates to a charger for charging a secondary battery of, for example, a cellular phone, and an integrated circuit capable of controlling a charging operation for the secondary battery is charged.

2. Description of Related Art

In general, a secondary battery (secondary cell) has been used as a power source of a cellular phone etc. Referring now to FIG. 2, a conventional charger for charging the cellular phone etc. is described. As shown in FIG. 2, a conventional charger 101 includes a charging current source 110, and a charging control circuit 120. The charging current source 110 supplies charging current to the secondary battery 111. The charging control circuit 120 controls the charging current source 110. The charging current source 110 is composed of a charging transistor 112, a diode 114, a detection resistor 113, and the secondary battery 111, which are connected in series. The charging transistor 112 is connected to an adaptor voltage. A charging current I flowing through the charging transistor 112 is supplied to the secondary battery 111 to charge the secondary battery 111.

The charging control circuit 120 detects the voltage across the detection resistor 113 in accordance with the charging current I supplied to the secondary battery 111 from the charging transistor 112. Then, the charging control circuit 120 controls the charging transistor 112 based on the detection result. The charging control circuit 120 includes a detection circuit 130, a control circuit 140, and an operational amplifier 141. The detection circuit 130 detects the voltage across the detection resistor 113. The control circuit 140 outputs a control signal S1 in accordance with the detection result. The operational amplifier 141 controls the charging transistor 112 in response to the control signal S1.

The detection circuit 130 includes an operational amplifier 131. The operational amplifier 131 has a negative terminal (inverting input terminal) connected with one end of the detection resistor 113 by way of an external connection terminal 117 and a resistor 133. Meanwhile, a positive terminal (noninverting input terminal) of the operational amplifier 131 is connected with the other end of the detection resistor 113 by way of an external connection terminal 118 and a resistor 134. Further, a feedback resistor 132 is connected between the negative terminal and an output terminal of the operational amplifier 131. In addition, the positive terminal is also connected with a grounded resistor 135. The charging control circuit 120 controls the charging transistor 112 such that the voltage across the detection resistor 113 is kept constant.

In connection with such a circuit controlling a charging operation for the secondary battery, Japanese Unexamined Patent Application Publication No. 9-84276 discloses the following charging method. That is, at an initial stage of charging, a charging transistor is turned on so as to quickly charge a secondary battery in a short time. After the secondary battery is charged to the fullest, the charging transistor is turned off, and a transistor smaller than the charging transistor is turned on. This aims at preventing the secondary battery from being overcharged as a result of quick charging by the charging transistor. To that end, the aforementioned smaller transistor takes over the charging operation for the secondary battery with a minute current.

Incidentally, in keeping with recent trends that various functions are being added to the cellular phones, there is a growing need to increase the battery capacity. Along with this, there is a tendency to increase the charging current for shortening a charging period.

In the above conventional charging control circuit of FIG. 2, and the charger disclosed in Japanese Unexamined Patent Application Publication No. 9-84276, however, a larger amount of charging current needs to flow through a charging transistor for quick charging at the time of charging, with a view to shortening the charging period as well as increasing the charging capacity. Such a large current causes a problem that the heat generation of the charging transistor is increased.

SUMMARY OF THE INVENTION

According to an aspect of the present invention, there is provided a charger that has a charging transistor series-connected with a secondary battery and supplying a first charging current to the secondary battery; and a charging integrated circuit controlling the charging transistor, wherein the charging integrated circuit includes a current source supplying a second charging current to the secondary battery, and the current source supplies the second charging current together with the first charging current to the secondary battery.

According to the present invention, the current source supplying the second charging current is provided inside the charging integrated circuit, so the secondary battery can be charged with the second charging current as well as the first charging current supplied from the charging transistor. Consequently, heat generation can be suppressed even when the charging current increases.

According to anther aspect of the present invention, there is provided a charger that has a first charging current source supplying a first charging current to a secondary battery; a second charging current source supplying a second charging current together with the first charging current to the secondary battery; and a charging control circuit controlling the first charging current source and the second charging current source, wherein the second charging current source and the charging control circuit are incorporated into one package.

According to the present invention, the two current sources are provided to simultaneously charge the secondary battery. One of the two parts and the charging control circuit are incorporated into one package, so the first charging current from the first current source is reduced a part of the total charging current, and the current source is packaged with the charging control circuit. Hence, there is no need to increase the number of components.

According to an aspect of the present invention, there is provided an integrated circuit controlling a charging transistor series-connected with a secondary battery and supplying a first charging current to the secondary battery that has a control circuit controlling the charging transistor; and a charging current source supplying a second charging current to the secondary battery, wherein the second charging current is supplied together with the first charging current to the secondary battery.

According to the present invention, the charging control circuit controlling the charging transistor charging the secondary battery is provided with the current source for charging the secondary battery together with the charging transistor, and thus imparted with a charging function. Hence, the circuit can charge the secondary battery together with the charging transistor to minimize the charging current flowing through the charging transistor and suppress the heat generation.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Hereinafter, an embodiment of the present invention is described in detail with reference to the accompanying drawings. This embodiment is such that the present invention is applied to a charger for charging a secondary battery used in, for example, a cellular phone. A charging integrated circuit according to this embodiment, and a charger using the same can disperse heat generated during the charging.

Figure 1:
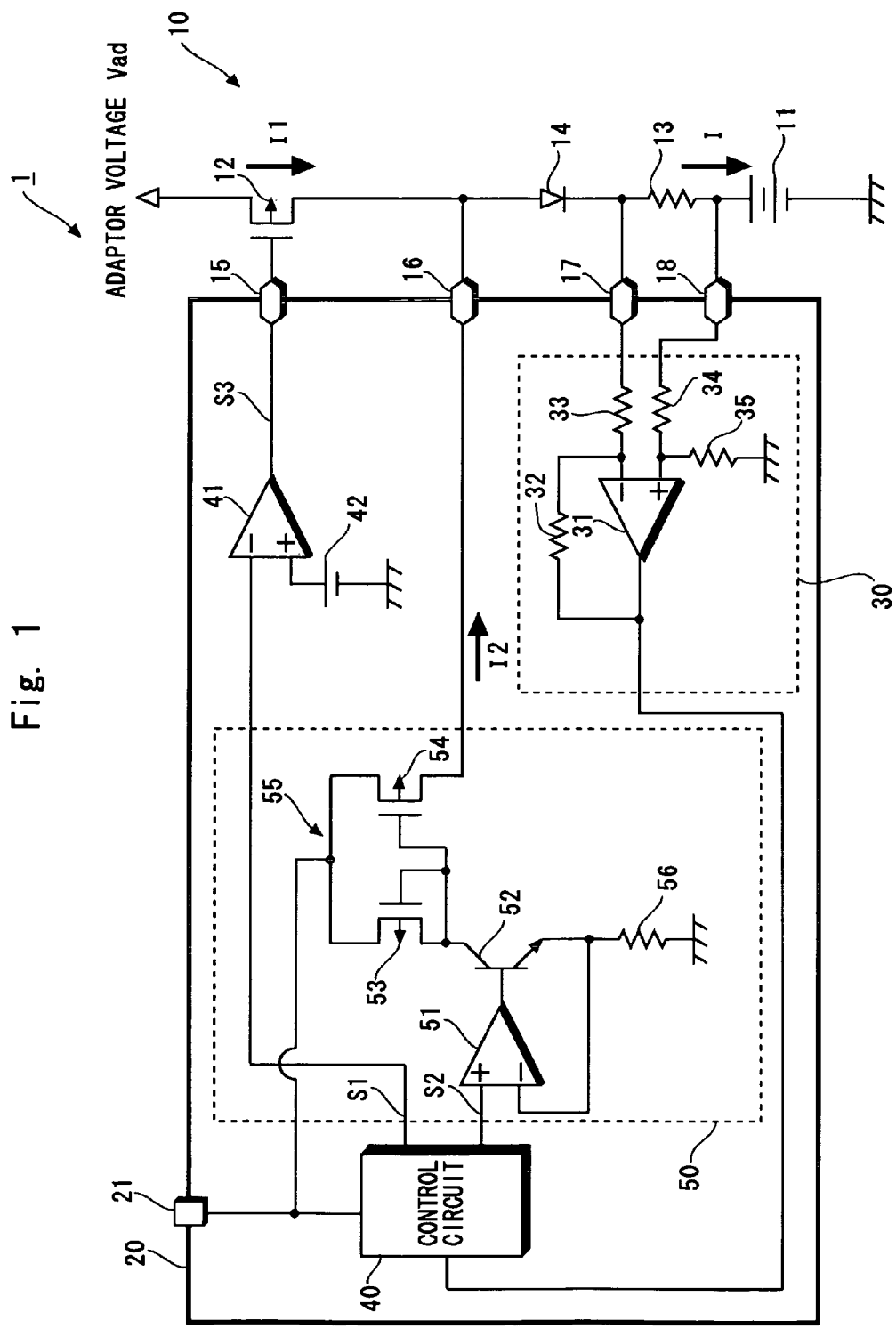
FIG. 1 shows a charger according to an embodiment of the present invention, which includes a charging control circuit and a charging unit.
Figure 2:
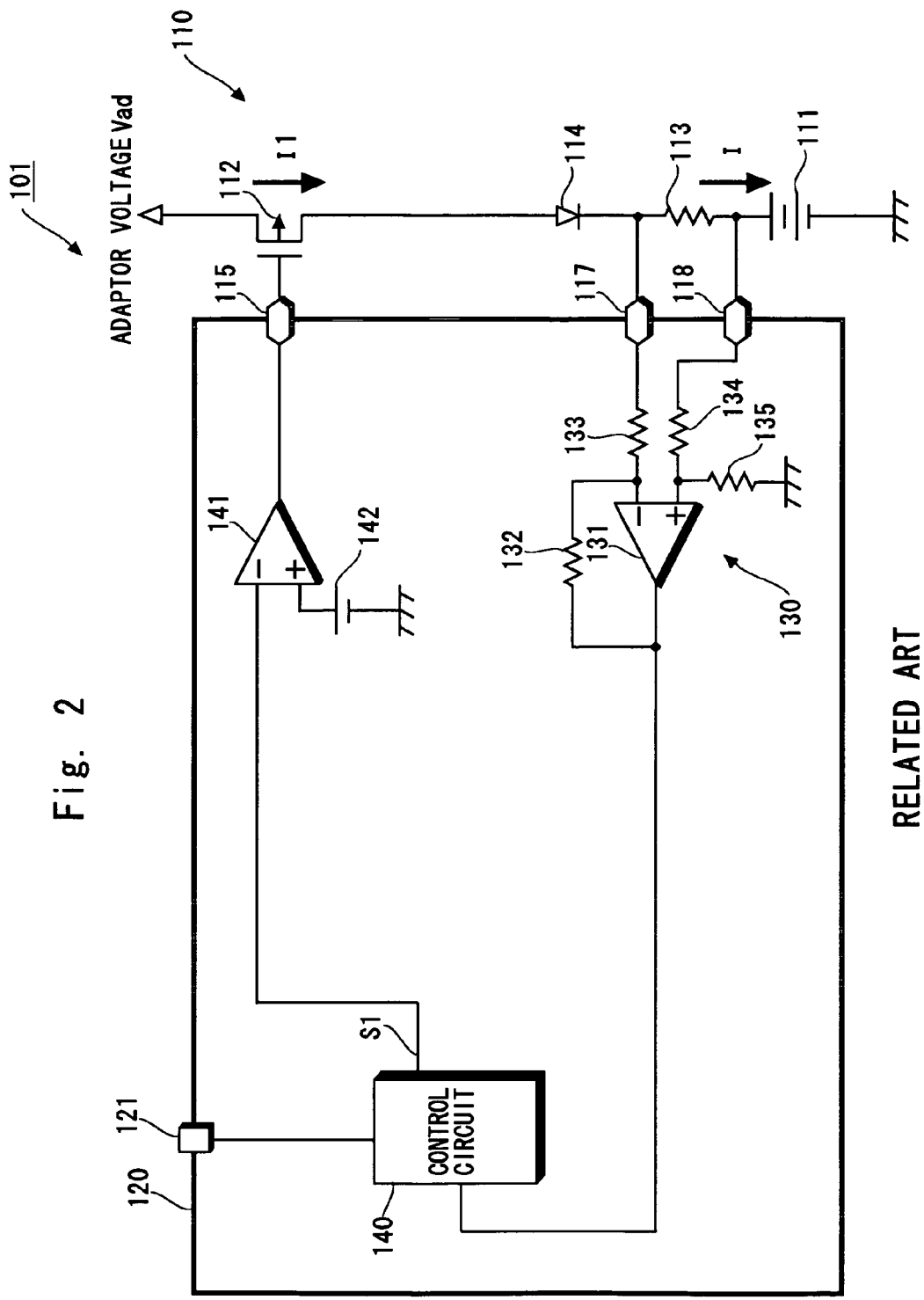
FIG. 2 shows a conventional charger including a charging control circuit and a charging unit.

FIG. 1 shows a charger according to the embodiment of the present invention. A charger 1 includes a first charging current source 10 for charging a secondary battery 11, and a charging integrated circuit 20 capable of charging the secondary battery 11 as well as controlling the charging current source 10.

The charging current source 10 includes a charging transistor 12 as a first charging current source made up of, for example, a P-channel FET (field effect transistor) series-connected with the secondary battery 11. The charging transistor 12 is connected to an adaptor voltage Vad to supply a charging current I1 to the secondary battery 11 as a first charging current. A second charging current I2 is supplied to the charging current source 10 from a charging integrated circuit 20 as discussed later. Then, the charging current I1 and charging current I2 are combined into a charging current I and supplied to the secondary battery 11 to thereby charge the secondary battery 11.

The charging current source 10 further includes a detection resistor 13 for detecting the charging current I, and a diode 14 that only allows a current to flow toward the secondary battery 11 from the adaptor voltage Vad.

The charging integrated circuit 20 includes a detection circuit 30 for detecting the charging current I with reference to the voltage across the detection resistor 13. Besides, the circuit 20 includes a control circuit 40 outputting a control signal S1 for controlling the charging current I1 based on the detection result of the detection circuit 30. Further, the charging integrated circuit 20 according to this embodiment includes a current source 50 as a second charging current source for supplying the charging current I2 to the secondary battery 11. The control circuit 40 outputs the control signal S1, and also outputs a control signal S2 for controlling the charging current I2.

The charging integrated circuit 20 according to this embodiment has two functions: a function of a charging control circuit controlling the charging transistor 12 of the charging current source 10; and a function of a charging current source charging the secondary battery 11. Owing to these functions, the charging integrated circuit 20 controls the charging current I1 and in addition, charges the secondary battery 11 with the charging current I2.

The detection circuit 30 includes an operational amplifier 31 that generates an output signal in accordance with the potential difference across the detection resistor 13. A feedback resistor 32 is connected between a negative terminal (inverting input terminal) and an output terminal of the operational amplifier 31. Further, the negative terminal of the operational amplifier 31 is also connected with one end of a resistor 33. The other end of the resistor 33 is connected with one end of the detection resistor 13 by way of an external connection terminal 17.

Besides, a positive terminal (noninverting input terminal) of the operational amplifier 31 is connected with a grounded resistor 35. Further, the positive terminal is connected with one end of a resistor 34. The other end of the resistor 34 is connected with an external connection terminal 18 connected with the other end of detection resistor 13.

The detection circuit 30 detects the potential difference across the detection resistor 13 in accordance with the charging current I consisting of first charging current I1 and the second charging current I2 and sends a detection result based on the potential difference to the control circuit 40.

Further, the charging integrated circuit 20 includes an operational amplifier 41 outputting a control signal S3 for controlling the charging transistor 12 in response to the control signal S1 of the control circuit 40. Supplied to a negative terminal of the operational amplifier 41 is the control signal S1 from the control circuit 40. Further, its positive terminal is connected with a grounded power source 42. In the charging integrated circuit 20, the control circuit 40 first generates the control signal S1 based on the detection result of the above detection circuit 30. Then, the operational amplifier 41 outputs the voltage (control signal S3) in accordance with a potential of the power source 42 and the control signal S1. Subsequently, the output voltage is fed to the gate of the charging transistor 12 through an external connection terminal 15. As a result, the charging integrated circuit 20 controls the charging current I1 flowing through the charging transistor 12 based on the potential difference across the detection resistor 13.

The charging integrated circuit 20 further includes a power source terminal 21 applied with the adaptor voltage Vad when connected with the adaptor voltage source. An adaptor detection circuit (not shown) is provided inside or outside the control circuit 40. When the adaptor detection circuit detects that the charging integrated circuit 20 is connected with the adaptor voltage source, the charging integrated circuit 20 starts charging the secondary battery 11 as mentioned later.

The current source 50 includes an operational amplifier 51. The control signal S2 is supplied from the control circuit 40 to a positive terminal of the operational amplifier 51. The current source 50 further includes a transistor 52 whose base is connected with an output terminal of the operational amplifier 51. The transistor 52 has a collector connected with sources of P ch MOS transistors 53, 54 which constitute a current mirror circuit 55. The drains of P ch MOS transistors 53, 54 are connected with the power source terminal 21. The current mirror circuit 55 is configured of transistors 53 and 54. Further, an emitter of the transistor 52 is connected with a grounded resistor 56.

In the current source 50, the transistor 52 is turned on in response to the control signal S2 from the control circuit 40 to supply the charging current I2 from the current mirror circuit 55 to the charging current source 10 through the external connection terminal 16. The external connection terminal 16 is connected to the contact between the charging transistor 12 and the diode 14. Hence, when supplied to the charging current source 10, the charging current I2 is combined with the charging current I1 supplied from the charging transistor 12 and then supplied to secondary battery 11 by way of the diode 14 and the detection resistor 13, together with the charging current I1.

With such configurations, the secondary battery 11 is supplied with the charging current I1 and the charging current I2 as the charging current I and besides, the charging currents I1 and I2 are kept at a fixed value under control.

In general, a charging period for the secondary battery 11 is divided into a constant-current charging period for charging the battery with a constant current, and a constant-voltage charging period for charging the battery at a constant voltage. Here, the constant-current charging period includes a pre-charging period, and a main charging period in some cases. The pre-charging period is such a period that the battery is charged with a small amount of current, for example, about 10 to 150 mA, up to a predetermined voltage, for example, about 3 to 3.4 V. The main charging period is such a period that the battery is charged with a large amount of current from the predetermined voltage up to a target voltage, for example, about 4.2 V.

Note that heat generated during the constant-current period becomes a problem in quick charging. If the charging period includes the pre-charging period and the main charging period as described above, more charging current is consumed, and particularly, a larger quantity of heat is generated during the main charging period requiring a larger amount of charging current. According to this embodiment, the secondary battery 11 is charged with not only the charging current I1 from the charging transistor 12 but also the charging current I2 from the current source 50 during the constant-current charging period including at least the main charging period. Thus, the charging current I is divided to reduce the charging current I1 flowing through the charging transistor 12, thereby dispersing generated heat.

This embodiment describes the case where the battery is charged with the charging currents I1 and I2 during the main charging period following the pre-charging period, by way of example. However, the pre-charging period may be omitted by using the adaptor or the like. Further, the present invention is not limited to such a charging operation based on the charging periods. Needless to say, if the present invention is applied to the case where a larger amount of charging current is required, the charging current flowing through the charging transistor 12 can be reduced to suppress the heat generation. The present invention is especially effective for the case where a package of the charging transistor 12 is small, and the transistor 12 generates a large quantity of heat. Further, the description of this embodiment is made on the assumption that the current source 50 for supplying the charging current I2 is provided inside the charging integrated circuit 20. However, the current source 50 can be incorporated into another package etc. to reduce the heat generation at the time of charging, insofar as the package is high in heat releasability, and the control circuit 40 can control the current source 50.

Further, the description of this embodiment is made on the assumption that the operational amplifier 41 controls the charging transistor 12 based on the control signal S1 from the control circuit 40, and controls the current source 50 based on the control signal S2. However, the output signal of the operational amplifier 31 may be fed to the operational amplifier 41 to control the charging current I1, for example. In this case, while the charging voltage of the secondary battery 11 is detected, the secondary battery may be charged with the charging current I2 supplied from the current source 50 during the aforementioned constant-current charging period, namely, a period until the predetermined voltage is reached.

Next, the operation of the charger 1 thus structured is described. First of all, when the adaptor voltage detection circuit (not shown) detects the adaptor voltage Vad, an adaptor detection signal is sent to the control circuit 40. The control circuit 40 supplies the control signals S1 and S2 to the operational amplifiers 41 and 51, respectively, in accordance with the adaptor voltage detection signal. The operational amplifier 41 outputs the control signal S3 in accordance with the control signal S1. The control signal S3 is applied to the gate electrode of the charging transistor 12. The charging current I1 adjusted to the control signal S3 flows through the charging transistor 12.

The control circuit 40 continues the constant-current charging by means of the charging transistor 12 and the current source 50 until the charging voltage of the secondary battery 11 reaches the predetermined value, for example, 4.2 V. For this purpose, the charging integrated circuit 20 includes a voltage measuring circuit for monitoring and measuring the charging voltage of the secondary battery 11. Then, when the adaptor voltage Vad is detected, a current charging voltage of the secondary battery 11 is measured to send the measurement result to the control circuit 40. The control circuit 40 controls the charging transistor 12 and the current source 50 using the control signals S1 and S2, respectively, to continue charging the secondary battery 11 until the charging voltage reaches the predetermined value.

To elaborate, the negative terminal of the operational amplifier 31 is applied with the voltage at one end of the detection resistor 13, while the positive terminal thereof is applied with the voltage at the other end of the detection resistor 13. The operational amplifier 31 sends the detection result based on the voltages, to the control circuit 40. The control circuit 40 controls the current source 50 using the control signal S2 so as to supply the charging current I2 until the secondary battery 11 is charged up to the predetermined value. At the same time, the control circuit 40 controls the charging transistor 12 using the control signal S1 so as to keep the charging current I1 flowing through the charging transistor 12 constant.

The operational amplifier 51 determines the voltage at the contact between one end of the resistor 56, that is, the emitter of the transistor 52, and the resistor 56 in response to the control signal S2 from the control circuit 40. The current mirror circuit 55 configured of the transistors 53 and 54 generates the charging current I2 in accordance with the current flowing through the resistor 56. The charging current I2 is output from the external connection terminal 16 and then combined with the charging current I1 into the charging current I to be supplied to the secondary battery 11.

Here, the control signal S2 takes the fixed voltage value, so the current value of the current I2 is kept constant. Hence, the control circuit 40 controls the gate voltage of the charging transistor 12 using the control signal S1 such that the voltage across the detection resistor 13 is kept constant.

In the thus-structured charger 1 of this embodiment, the charging current I necessary for charging the secondary battery 11 is divided into the charging current I1 and the charging current I2. One of the two, the charging current I1, is supplied to the secondary battery 11 from the charging transistor 12 in a conventional manner. The other one, the charging current I2, is supplied to the secondary battery 11 from the current source 50 provided inside the charging integrated circuit 20. As mentioned above, at the time of charging the charging current I, some of the charging current I is supplied from the charging integrated circuit 20, as the charging current I2. This suppresses the charging current I1 flowing through the charging transistor 12 and heat generation of the charging transistor 12.

Further, the current source 50 supplying the charging current I2 is provided inside the charging integrated circuit 20. A package for an IC constituting the charging integrated circuit 20 is larger in area than the package containing the charging transistor 12. Therefore, the charging integrated circuit 20 is low in thermal resistance, and exhibits high heat releasability even if a larger amount of charging current flows at the time of charging, whereby the heat generation can be minimized.

For example, if plural charging transistors with a smaller amount of charging current are provided for suppressing the heat generation of the charging transistor 12, the heat generation of each charging transistor can be reduced. However, if those transistors are incorporated into the packages of the same size, the total heat generation cannot be reduced. In contrast, if the current source 50 is provided inside the charging integrated circuit 20 of a high heat releasability as in this embodiment, the heat generation due to the charging current I2 can be minimized to reduce the heat generation of the entire charger.

As discussed above, according to this embodiment, when the charging transistor 12 charges the secondary battery 11, not only used is the charging transistor 12, but the current source 50 provided inside the charging integrated circuit 20 is used together with the charging transistor 12 to charge the secondary battery 11. That is, the charging current I is supplied from two sources. One of the two sources, the current source 50, is incorporated into the high-heat-releasability package of the charging integrated circuit 20, making it possible to suppress the total heat generation. For example, provided that the charging transistor 12 is in a 6-pin mini-mold package, and the charging integrated circuit 20 is in an 8-pin SOP (small outline package), the former shows a thermal resistance of 147° C./W, for example, when mounted to the board, while the latter shows the thermal resistance of 85° C./W, for example. Therefore, the charging integrated circuit 20 in the large package is used to supply the charging current I2, so it is only necessary to cause the charging current I1 smaller than the charging current I necessary for charging the secondary battery 11 to flow through the charging transistor 12. Consequently, the heat generation of the charging transistor 12 can be minimized. In addition, the charging current I2 is supplied from the charging integrated circuit 20 having a high heat releasability, so the heat generation due to the inflow of the charging current I2 can be minimized.

Here, each of the charging currents I1 and I2 may simply account for ½ of the charging current I. Instead, the charging current I may be divided into the two at a thermal resistance ratio. In other words, if the charging transistor 12 has the thermal resistance twice the thermal resistance of the charging integrated circuit 20, an amount of the charging current I2 supplied from the charging integrated circuit 20 is set twice larger than an amount of the charging current I1 supplied from the charging transistor 12. With this settings, the heat generation of the charging transistor 12 and that of the charging integrated circuit 20 can be reduced down to almost the same level.

With the above configuration, even when the charging current I increases, the heat generation can be suppressed. Further, the current source 50 is provided inside the charging integrated circuit 20, whereby additional components for suppressing the heat generation are unnecessary. Hence, there is no need to increase the number of components. Further, the charging integrated circuit 20 is superior to the charging transistor 12 in heat releasability, so the charging current I can be further increases as necessary.

Further, the present invention is not limited to the above embodiment alone, and needless to say, various modifications can be made without departing the scope of the invention. For example, cellular phones incorporate a battery management circuit. The battery management circuit functions to supply power as necessary, to various ICs incorporated into the cellular phone, and is driven by the secondary battery 11 as the power source. To that end, the battery management circuit and the above charging integrated circuit are incorporated onto one chip, whereby the chip area can be further increased, and the heat releasability can be further enhanced. In this case, assuming that the battery management circuit and the charging integrated circuit are in, for example, a 144TFPBGA (tape fine pitch ball grid array) package, a thermal resistance is about 46.6° C./W when mounted to the board, making it possible to further enhance the heat releasability and drastically reduce the heat generation.

It is apparent that the present invention is not limited to the above embodiment that may be modified and changed without departing from the scope and spirit of the invention.

What is claimed is:

1. A charger, comprising:
 a charging transistor series-connected with a secondary battery and supplying a first charging current from a first power source to the secondary battery; and
 a charging integrated circuit controlling the charging transistor,
 wherein the charging integrated circuit includes a current source supplying a second charging current to the secondary battery, and
 the current source supplies the second charging current together with the first charging current to the secondary battery, wherein said current source supplying said second charging current comprises a second charging transistor that is series-connected between said secondary battery and a voltage terminal of said charging integrated circuit.

2. The charger according to claim 1, wherein the charging integrated circuit has a thermal resistance smaller than a thermal resistance of the charging transistor.

3. The charger according to claim 2, wherein the charging integrated circuit includes:
 a current detection circuit detecting the first charging current and the second charging current; and
 a control circuit controlling the charging transistor based on a detection result of the current detection circuit.

4. The charger according to claim 2, wherein the charging integrated circuit includes:
 a current detection circuit detecting the first charging current and the second charging current; and
 a control circuit controlling the charging transistor and the current source based on a detection result of the current detection circuit.

5. The charger according to claim 2, further comprising a control circuit controlling the current source based on a result of detecting a charging voltage of the secondary battery.

6. The charger according to claim 1, wherein the charging integrated circuit includes:
 a current detection circuit detecting the first charging current and the second charging current; and
 a control circuit controlling the charging transistor based on a detection result of the current detection circuit.

7. The charger according to claim 1, wherein the charging integrated circuit includes:
 a current detection circuit detecting the first charging current and the second charging current; and a control circuit controlling the charging transistor and the current source based on a detection result of the current detection circuit.

8. The charger according to claim 7, wherein the current source supplies a constant current in response to control of the control circuit.

9. The charger according to claim 7,
wherein a charging period for the secondary battery includes a constant-current charging period for charging the secondary battery with a constant current, and a constant-voltage charging period for charging the secondary battery at a constant voltage, and
the control circuit controls the charging transistor and the current source during at least the constant-current charging period.

10. The charger according to claim 1, further comprising a control circuit controlling the current source based on a result of detecting a charging voltage of the secondary battery.

11. The charger of claim 1, wherein said second charging transistor is controlled as a current mirror.

12. A charger, comprising:
a first charging current source supplying a first charging current to a secondary battery;
a second charging current source supplying a second charging current together with the first charging current to the secondary battery; and
a charging control circuit controlling the first charging current source and the second charging current source,
wherein the second charging current source and the charging control circuit are incorporated into one package, wherein said second charging current source comprises a transistor controlled as a current mirror.

13. The charger according to claim 12, wherein the package into which the second charging current source and the charging control circuit are incorporated, has a thermal resistance smaller than a thermal resistance of a package into which the first charging current source is incorporated.

14. An integrated circuit controlling a charging transistor series-connected with a secondary battery and supplying a first charging current to the secondary battery, comprising:
a control circuit controlling the charging transistor; and
a charging current source supplying a second charging current to the secondary battery,
wherein the second charging current is supplied together with the first charging current to the secondary battery, wherein said charging current source comprises a transistor controlled as a current mirror.

15. The integrated circuit according to claim 14, further comprising:
a detection circuit detecting the first charging current and the second charging current supplied to the secondary battery,
wherein the control circuit controlling the charging transistor and the charging current source based on a detection result of the detection circuit.

16. The integrated circuit according to claim 15, further comprising a monitoring circuit monitoring a charged state of the secondary battery.

17. The integrated circuit according to claim 14, further comprising a monitoring circuit monitoring a charged state of the secondary battery.

* * * * *